(12) United States Patent
Uuskoski et al.

(10) Patent No.: US 6,179,242 B1
(45) Date of Patent: Jan. 30, 2001

(54) PRESS ROLL UNIT FOR REEL-UP OF PAPER CUTTER

(75) Inventors: Klaus Uuskoski; Jouko Virta, both of Hyvinkää (FI)

(73) Assignee: KCI Konecranes International PLC (FI)

( * ) Notice: Under 35 U.S.C. 154(b), the term of this patent shall be extended for 0 days.

(21) Appl. No.: 09/297,934

(22) PCT Filed: Nov. 10, 1997

(86) PCT No.: PCT/FI97/00681

§ 371 Date: Jun. 30, 1999

§ 102(e) Date: Jun. 30, 1999

(87) PCT Pub. No.: WO98/21016

PCT Pub. Date: May 22, 1998

(51) Int. Cl.[7] .................................................. B65H 18/26
(52) U.S. Cl. ..................... 242/547; 242/541.4; 198/832; 198/835
(58) Field of Search ..................... 292/547, 541, 292/541.4, 541.5, 541.6, 541.7, 541.3; 198/780, 832, 835

(56) References Cited

U.S. PATENT DOCUMENTS

| 2,360,275 | * | 10/1944 | Rau . |
| 3,698,658 | * | 10/1972 | Skei . |
| 3,791,602 | * | 2/1974 | Isakson . |
| 3,957,220 | * | 5/1976 | Beck et al. . |
| 4,508,279 | * | 4/1985 | Tokuno et al. . |
| 4,518,300 |   | 5/1985 | Kent . |
| 4,723,724 | * | 2/1988 | Bradley . |

FOREIGN PATENT DOCUMENTS 0274229    7/1988  (EP) .

* cited by examiner

*Primary Examiner*—Donald P. Walsh
*Assistant Examiner*—William Rivera
(74) *Attorney, Agent, or Firm*—Birch, Stewart, Kolasch & Birch, LLP

(57) ABSTRACT

A press roll unit for a roll-up of a paper cutter has two adjacent rolls. A belt or plurality of belts is wound around the rolls to operatively interconnect them. An electric motor inside at least one roll drives the roll unit. The belt or plurality of belts have at least one aperture for cooling the electric motor and the roll surrounding it.

9 Claims, 1 Drawing Sheet

PRESS ROLL UNIT FOR REEL-UP OF PAPER CUTTER

This application is the national phase under 35 U.S.C. §371 of PCT International Application No. PCT/FI97/00681 which has an International filing date of Nov. 10, 1997 which designated the United States of America.

BACKGROUND OF THE INVENTION

The invention relates to a press roll unit for a reel-up of a paper cutter, the press roll unit comprising two adjacent rolls around which there runs a belt arrangement operatively interconnecting the rolls, an electric motor driving the roll unit being arranged inside at least one roll.

DESCRIPTION OF THE BACKGROUND ART

Electric motors are usually cooled by blowing air through conduits inside or on the surface of the motor by means of a blower that is mounted on the shaft of the electric motor or is driven by a separate motor. It is essential that the rate of the air current passing the surface to be cooled is rendered sufficiently high.

Where a press roll unit is concerned, the electric motor driving the unit is an external rotor motor which is mounted inside a press roll and which cannot be cooled normally. The belt arrangement covering the rolls is usually made of rubber, and so heat does not transfer sufficiently, since the rubber belt has poor heat conductivity as compared with steel, which the rolls are made from.

SUMMARY OF THE INVENTION

The object of the present invention is to eliminate the above drawback, i.e. to effect sufficient cooling of the motor itself and the surface of the roll located at the motor. The object is achieved with a press roll unit which is characterized in that at least one aperture is formed in the belt arrangement so as to cool the electric motor and the roll surrounding it.

The invention is based on the idea that the surface of a rotating roll is brought into direct contact with the surrounding air, which ensures efficient transfer of heat from the roll to the air.

The most preferable solution is probably one in which the belt arrangement comprises at least two belts spaced at a predefined distance from each other to form the above-mentioned at least one cooling aperture.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following the invention will be described in greater detail by means of some preferred embodiments and with reference to the attached to drawings which are given by way of illustration only, and thus are not limitive of the present invention, and in which.

DETAILED DESCRIPTION OF THE PREFERRED EMBODIMENT

Figure 1:
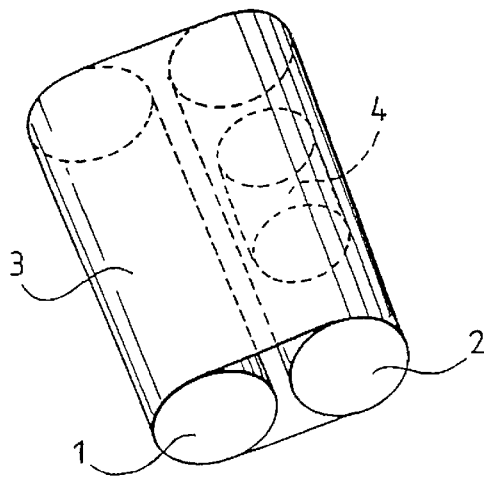
FIG. 1 shows a common press roll unit.

A common press roll unit for a reel-up of a paper cutter shown in FIG. 1 comprises two adjacent rolls 1 and 2 around which there runs a continuous rubber belt 3 that interconnects the rolls operatively, extends over the entire width of the rolls, and covers them entirely. To use the press roll unit, an electric motor 4 is arranged inside both rolls 1 and 2. Alternatively, the press roll unit can also be used by an electric motor arranged in a single roll.

Figure 2:
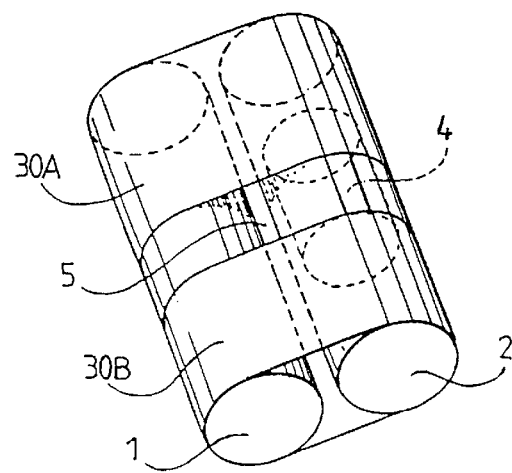
FIG. 2 shows a preferred press roll unit according to the invention.

The press roll unit of the invention shown in FIG. 2 differs from the common solution of FIG. 1 in that the belt arrangement running around the rolls 1 and 2 is divided into two belts 30A and 30B that are spaced from each other such that there is an open space 5 between them at the electric motor 4 located inside the roll 1,2. The heat conducted from the motor 4 to the roll 1,2 can therefore be transferred effectively to the air thanks to the difference of rate between the surrounding air and the roll 1,2, and so the temperature of the motor 4 and the roll 1,2 can be maintained considerably lower than in the solution described above in FIG. 1.

Figure 3:
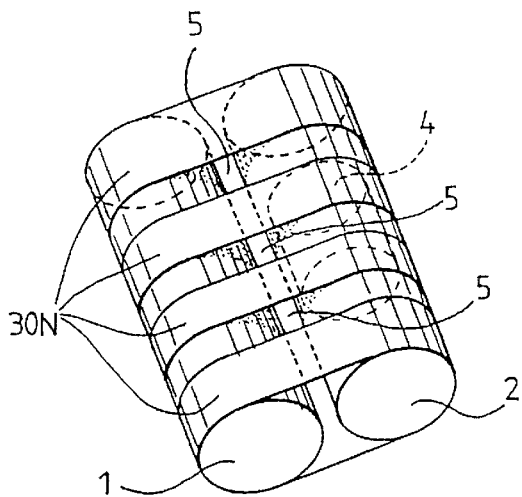
FIGS. 3 and 4 show alternative embodiments according to the invention.

In the alternative solution of the invention shown in FIG. 3 the belt arrangement is divided into an even larger number of separate belts 30N, and so there is also a larger number of spaces 5 between the belts 30N that cool the roll 1,2 and the motor 4. Any heat conducted towards the ends of the rolls 1,2 can then be discharged more effectively, as a result of which the heat stress in the roll unit decreases further.

Figure 4:
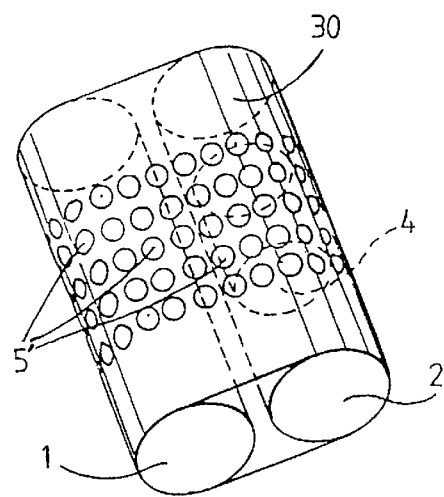

FIG. 4 in turn shows another alternative structure according to the invention, which comprises a belt 30 running around the rolls 1,2 and extending over the entire width of the rolls, like in the common solution shown in FIG. 1. This structure, however, is perforated (perforations 5') in the circumferential direction at least at the electric motor 4 so as to effect the above-described direct contact between the roll surface and the surrounding air, and the cooling resulting from the direct contact.

The above-described reduction of heat stress enhances the wear resistance of the motor 4, the rolls 1,2 and the belt arrangement, and reduces harmful heat expansion caused by the uneven heating of the rolls 1,2.

The invention is described above only by means of a few preferred embodiments. A skilled worker, however, can implement the structure freely without deviating from the scope defined by the attached claims.

What is claimed is:

1. A press roll unit for a reel-up of a paper cutter comprising:

at least two adjacent rolls with a belt arrangement which runs therearound, the belt arrangement operatively interconnects the rolls;

an motor for driving the roll unit, the motor being inside at least one roll;

at least one aperture provided in the belt arrangement, the at least one aperture passing over the motor for cooling the motor and roll surrounding the motor.

2. The press roll unit according to claim 1, wherein the motor is an electric motor.

3. The press roll unit according to claim 1, wherein the belt arrangement comprises at least two belts which are spaced at a predefined distance from each other so as to form the at least one cooling aperture.

4. The press roll unit according to claim 3, wherein the at least two belts comprise more than two belts.

5. The press roll unit according to claim 1, wherein the belt arrangement comprises a belt provided with more than one aperture.

6. The press roll unit according to claim 5, wherein the plurality of apertures are arranged around a circumference of the belt.

7. The press roll unit according to claim 1, wherein the belt arrangement comprises at least two apertures, the apertures acting as cooling apertures.

8. The press roll unit according to claim 1, wherein the belt arrangement passes between the rolls without any suction being applied thereto.

9. The press roll unit according to claim 1, wherein the belt arrangement has an inner side and an outer side and wherein atmospheric pressure on both sides of the belt arrangement is constant.

* * * * *